United States Patent

Senn et al.

(10) Patent No.: US 8,591,779 B2
(45) Date of Patent: Nov. 26, 2013

(54) METHOD OF MANUFACTURING PLASTIC CONTAINERS

(75) Inventors: Konrad Senn, Regensburg (DE); Frank Winzinger, Regensburg (DE); Robert Aust, Barbing (DE)

(73) Assignee: Krones AG, Neutraubling (DE)

( * ) Notice: Subject to any disclaimer, the term of this patent is extended or adjusted under 35 U.S.C. 154(b) by 151 days.

(21) Appl. No.: 13/046,996

(22) Filed: Mar. 14, 2011

(65) Prior Publication Data

US 2011/0236517 A1    Sep. 29, 2011

(30) Foreign Application Priority Data

Mar. 26, 2010 (DE) .......................... 10 2010 003 350

(51) Int. Cl.
*B29C 49/06* (2006.01)
*B29C 49/68* (2006.01)
*B29C 49/78* (2006.01)

(52) U.S. Cl.
USPC .......... 264/40.1; 264/523; 264/535; 264/538; 425/136; 425/522; 425/526; 425/534

(58) Field of Classification Search
USPC ......... 425/136, 522, 526, 534; 264/40.1, 523, 264/535, 537, 538
See application file for complete search history.

(56) References Cited

U.S. PATENT DOCUMENTS

| 4,356,907 A | * | 11/1982 | Aidlin et al. | 198/427 |
| 5,840,350 A | * | 11/1998 | Salemi | 425/533 |
| 6,189,701 B1 | * | 2/2001 | Winter | 209/523 |
| 6,345,973 B1 | * | 2/2002 | Nielsen | 425/145 |
| 7,900,422 B2 | | 3/2011 | Fischer | |
| 2002/0011681 A1 | | 1/2002 | Rose et al. | |

FOREIGN PATENT DOCUMENTS

| DE | 19737697 A1 | 3/1999 |
| DE | 69526864 T2 | 1/2003 |
| DE | 102006053193 A1 | 5/2008 |
| DE | 102008026043 A1 | 12/2009 |
| DE | 102008030866 A1 | 12/2009 |
| WO | WO-2008017485 A1 | 2/2008 |

OTHER PUBLICATIONS

German Search Report for 10 2010 003 350.2 mailed Mar. 16, 2012.

* cited by examiner

*Primary Examiner* — Robert B Davis
(74) *Attorney, Agent, or Firm* — Marshall, Gerstein & Borun LLP

(57) ABSTRACT

A method of manufacturing plastic containers by a blow molding machine, where the blow molding machine is operated such that at least two different plastic containers are output from the blow molding machine within one production cycle.

20 Claims, 13 Drawing Sheets

METHOD OF MANUFACTURING PLASTIC CONTAINERS

CROSS-REFERENCE TO RELATED APPLICATION

The present application claims the benefit of priority of German Patent Application No. 102010003350.2 filed Mar. 26, 2010. The entire text of the priority application is incorporated herein by reference in its entirety.

FIELD OF THE DISCLOSURE

The disclosure relates to a method of manufacturing plastic containers by means of a blow molding machine.

BACKGROUND

Product packs with various products, for example different beverages, are ever more often offered. For example, two bottles of orange juice, two bottles of currant juice and two bottles of water can be contained in a sixpack of beverages. To produce such mixed product packs, the products are usually produced individually in a bottling line, packed, and then commissioned to form a product pack.

In the process, the various products are often filled into different plastic containers, for example into plastic containers of different colors. The different plastic containers are often produced by means of a blow molding machine in several production cycles, where in each one of the production cycles, only one type of plastic container is produced.

SUMMARY OF THE DISCLOSURE

It is one aspect of the present disclosure to provide an improved method of manufacturing plastic containers by means of a blow molding machine.

In particular, the disclosure provides a method of manufacturing plastic containers by means of a blow molding machine, characterized in that the blow molding machine is operated such that at least two different plastic containers are output from the blow molding machine within one production cycle.

By the at least two different plastic containers being output in one production cycle, downtimes for manual readjustment of the blow molding machine from one container type to another one can be avoided.

The plastic containers can in particular be plastic bottles, for example PET (polyethylene terephthala(e) bottles.

"In one production cycle" means in this context that the at least two different plastic containers are output in one cycle, that means that between outputting a first plastic container and a second plastic container that differs from the first one, no manual readjustments of the blow molding machine are necessary. In other words, a production cycle means the manufacture of several plastic containers without any standstill of the blow molding machine for readjusting the blow molding machine.

With interposed buffers and/or in case of defects of the blow molding machine, however, a standstill of the blow molding machine can occur. In blow molding machines which are operated as phased machines, a production cycle can also mean the production over several phases.

The blow molding machine can comprise a machine protection, where in particular the machine protection is not opened within one production cycle.

The plastic containers can he continuously carried away from the blow molding machine within one production cycle. This is in particular true for rotary machines.

In particular, the different containers can be carried away on the same transport path or the same transport section.

The output plastic containers can be forwarded to a further treatment element, in particular a filler, a labeling device and/or a sterilization device.

"Different" means that the plastic containers must be different in at least one physical, chemical and/or geometric property.

Operation of the blow molding machine can mean control and/or adjustment and/or design.

The at least two different plastic containers can in particular correspond to at least two different plastic container types. That means, one or several plastic containers of a first plastic container type and one or several plastic containers of at least one second plastic container type can be output from the blow molding machine in one production cycle.

In particular, 3, 4, 5, 6, 7, 8, 9, or 10, or even 15, 20, 24, or 36 different plastic containers or plastic container types can bc output from the blow molding machine in one production cycle.

The at least two different plastic containers can be manufactured from preforms, in particular from at least two different preforms, or from preforms of the same kind. The preforms can comprise plastics, in particular PET.

The method of manufacturing plastic containers can moreover comprise the feeding of the preforms.

The blow molding machine can correspond to a manufacturing machine for manufacturing plastic containers. The blow molding machine can in particular comprise a heating device and a blow molding machine. The method can comprise thermal conditioning of the preforms in the heating device and/or an expansion of the preforms in the blow molding machine. Thermal conditioning can in particular comprise heating and/or cooling of the preforms.

The blow molding machine can also correspond to an injection molding machine for injection molding plastic containers in one or several final molds, or a molding press for compression molding the plastic containers.

The at least two different plastic containers and/or different preforms differ in one or several physical, chemical and/or geometric properties. In particular, the plastic containers and/or preforms can comprise different geometric properties, for example different sizes, neck diameters and/or lengths. The different plastic containers and/or preforms can also differ in optical properties, for example color and/or transparency, and/or in the material, in particular the material composition. For example, the different plastic containers and/or preforms can contain different quantities of an infrared absorption material.

The different plastic containers and/or preforms can also comprise different threads for different closures.

The different plastic containers and/or preforms can also comprise different positions for indicators for the attachment of different closures or closures of the same kind. As an indicator, for example a notch or a bulging at the edge of a supporting ring of the plastic containers and/or preforms can be used.

The different plastic containers and/or preforms can also comprise different materials or consist of different materials. For example, plastic containers of PET and PP (polypropylene) can be simultaneously produced on the blow molding machine. Other combinations of PET, PP, PS (polystyrene), PLA (polyvinyl alcohol) and/or other types of plastics are also conceivable.

The at least two different plastic containers and/or preforms can also have different weights. different stabilities and/or different coatings. In particular, an additional coating module can be provided, in particular upstream of the blow molding machine, for example a blow molding wheel.

The at least two different plastic containers anchor preforms can be treated with at least one treatment parameter within the blow molding machine, where the at least one treatment parameter for the at least two different plastic containers and/or the preforms is different and/or has a different value.

In a blow molding machine, the preforms can be heated in a first step and molded to the desired plastic containers in a second step by means of a blow molding process, in particular a stretch-blow molding process.

Heating of the preforms can be carried out in a heating device of the blow molding machine.

A heating device of the blow molding machine can be operated, in particular controlled, such that the preforms are heated to different temperatures. In particular, different temperatures can be selected for the blow molding process, in particular the stretch-blow molding process, for different preforms. The heating device of the blow molding machine can in particular be operated such that the preforms can be heated to different temperatures in different areas of a longitudinal axis and/or in different areas in the axial direction of the preforms.

The heating device of the blow molding machine can be, for example, a conventional stationary, linear or rotary oven. In particular, the heating device can comprise heating elements, in particular where each heating element serves for conditioning all preforms, or comprises cavities individually allocated to individual preforms, in particular heating jackets, or, in microwave ovens, resonators. In the cavities, of a microwave oven or an oven with heating jackets, a small number of preforms, in most case one, is attemperated individually.

In case of a single-stage process, that means when the preforms arc manufactured by means of injection molding and are transferred to the heating device of the blow molding machine while they are still heated from the injection molding process, the preforms can be cooled in the heating device.

The at least two different plastic containers can also be injection molded in one or several final molds, in particular different final molds. In this case, the procedure steps where preforms are supplied, conditioned and expanded to plastic containers, can be dispensed with.

The blow molding machine can comprise different treatment units. The treatment units can be, for example, heating elements and/or blow molding stations.

The preforms can be allocated to different treatment units. In other words, the blow molding machine can be controlled such that at least two preforms are allocated to different treatment units, in particular such that at least two different plastic containers are output in one production cycle.

The blow molding machine can comprise at least two blow molding stations, where the blow molding machine is controlled such that the preforms are allocated to different blow molding stations. The blow molding stations can here differ in various treatment parameters, such as the geometry of the blow mold, the stretch parameters used and/or the blow molding parameters used, for example preblow pressure, final blow pressure, rinsing time and/or switching times for the respective pressures.

A heating device, in particular heating elements of the heating device, can be controlled and/or embodied such that a preform can be provided with a predetermined heating profile or temperature profile ("preferential heating"). In particular, two preforms can be provided with different temperature profiles. For example, the preforms can be provided with a temperature profile in the circumferential direction and/or in the longitudinal direction. In other words, the temperature can be controlled at one or several predetermined points or areas of a preform.

At least two preforms can be treated in the heating device using different treatment parameter values. The treatment parameters of the heating device, in particular the heating elements of the heating device, can comprise a rotational speed of the preforms, introduced heat per area to be heated (layer or longitudinal area (preferential heating)), a distance to a heater, a speed of passage through the heating device, a shielding time of certain areas of a preform, a shielding position, a wavelength of radiation, a type of radiation and/or a field strength of microwave radiation.

The preforms can be introduced into the blow molding machine in a predetermined sequence. In particular, different preforms can then be fed to the corresponding, in particular different, treatment units of the blow molding machine in a simple manner.

The preforms can also be at least partially moved through the blow molding machine on different transport sections. By this, in particular different preforms can be processed in different ways. For example, a first preform can be moved through a heating device of the blow molding machine on a first transport section, while a second preform is moved through the heating device on a second transport section that is different from the first transport section. The different transport sections can in particular have different lengths. Thereby, a different heating time for the preforms can be achieved. The different transport sections can also move the different preforms past different heating elements, in particular past heating elements having different designs and/or controls, so that these are heated to different degrees.

As an alternative or in addition, the preforms can also be moved through the blow molding machine, in particular through a heating device of the blow molding machine, at different speeds.

The heating device of the blow molding machine can moreover comprise at least one shielding device. By this, portions of a preform, in particular the threads or so-called mouth regions, can be protected from heat supply and thus not be heated or heated to a lower degree. The at least one shielding device can be moved with the preform through the heating device. The shielding device can also be used for shielding certain areas of the preforms in the circumferential direction.

The shielding device can be operated, in particular controlled, in different ways for different preforms. For example, the moment of lifting and/or lowering the shielding device can be selected to be different for different preforms. The orientation of the shielding plate, e.g. in the circumferential direction of the preforms, can bc also correspondingly selected.

The method of manufacturing plastic containers can moreover comprise automatic detection of in particular different preforms. In this manner, the preforms can be selectively fed to the correct treatment unit of the blow molding machine in a simple manner. Automatic detection can comprise identifying at least one physical, chemical and/or geometric property of a preform.

In particular, at least onc detected preform can be allocated automatically, for example via one or several distributing guides, to at least one treatment unit.

As an alternative or in addition, at least one treatment parameter can be allocated to the at least one detected preform. In other words, the value of at least one treatment parameter can be selected corresponding to the detected preform, and the blow molding machine can be operated such that the detected preform is treated in the blow molding machine with the selected treatment parameter value.

The at least one treatment unit can correspond to a transport arbor, a transport clamp, an internal and/or external gripper, a blow mold, a heating element, a sterilization nozzle, a sorting unit and/or a conveyor means for conveying the plastic containers and/or preforms.

The at least one treatment parameter can correspond to the geometry of the blow mold, a used stretching parameter and/or blow molding parameter, for example a preblow pressure, a final blow pressure, a rinsing time and/or a switching time for the respective pressures.

Automatic detection of the preforms can be carried out, for example, optically, in particular by a camera. Automatic detection of the preforms can be integrated, for example, in an apparatus provided for measuring the infrared absorption degree.

The different preforms can be introduced into the blow molding machine based on a result of the automatic detection.

For example, the preforms can be taken from a chute and fed to a sorting unit where the preforms are sorted by means of automatic detection and thereupon introduced into the blow molding machine, in particular in a predetermined sequence.

The method of manufacturing the plastic containers can moreover comprise manufacturing the preforms, in particular by injection molding or compression molding. That means, the manufacture of the plastic containers can take place, for example, in an injection blow molding machine. The advantage of combined injection blowing is that the heat still present in the preform from injection molding can be maintained. After injection molding, the preform can be profiled by selective cooling and/or heating.

An injection module of the injection blow molding machine can be in particular operated such that different preforms can be manufactured. For example, the injection module can be designed such that at least two different preforms can be injection molded in different molds. As an alternative or in addition, several injection modules can be provided, where each injection module produces one type or one kind of preform, where the preforms of at least two injection modules differ.

The quantity of an infrared absorber introduced into the preform can be controlled in one or several injection modules. For example, at least two different preforms can be manufactured, where the quantity and/or the profiling of an infrared absorber differ in the at least two different preforms.

In case of manufacture by compression molding, the quantity of plastics discharged from an extruder can be controlled to manufacture at least two different preforms.

The method of manufacturing the plastic containers can moreover comprise sterilization of the preforms, in particular where the sterilization process for different preforms differs.

The invention moreover provides a blow molding machine for manufacturing plastic containers, where the blow molding machine is designed such that at least two different plastic containers can be output from the blow molding machine in one production cycle.

In particular, the blow molding machine can be a stretch blow molding machine and/or an injection blow molding machine. The blow molding machine can comprise one or several ones of the above-mentioned features. In particular, the blow molding machine can comprise at least two different and/or differently operated blow molding stations. The blow molding machine can also comprise different and/or differently operated heating elements, injection modules and/or sterilization elements.

The blow molding machine can moreover comprise a control means which is configured to carry out an above described method.

The blow molding machine can comprise different transport sections through the blow molding machine. Thereby, different preforms can be moved through the blow molding machine on different transport sections.

The blow molding machine can in particular comprise a heating device which is designed such that it can heat individual preforms individually, that means independent of other preforms, in particular with a predetermined heat profile.

The blow molding machine can comprise several blow molding stations, where different blow molding processes can be carried out or run in each blow molding station. The blow molding processes can differ, for example, in their blowing pressure, valve switching times, blowing angles and/or stretching speeds. In particular, the blow molding machine can be designed such that different blow molding processes can be simultaneously carried out in at least two blow molding stations.

The disclosure moreover provides a bottling plant, comprising an above described blow molding machine, a labeling device and/or a filler, where the labeling device and/or the filler are designed such that they fill at least two different products in one production cycle, or can apply at least two different labels in one production cycle.

With such a bottling plant, different articles can be manufactured in one production cycle, whereby downtimes for readjustments of the bottling line can be avoided or reduced.

According to a further aspect, the disclosure moreover provides a blow molding machine, comprising an inspection device for automatically detecting preforms.

This in particular permits to detect unsuited preforms introduced into the blow molding machine. If different preforms are to be manufactured in one blow molding machine, it can occur that preforms that are unsuited for the selected operating settings of the blow molding machine are introduced into the blow molding machine. If such a preform is used, the preform and/or the plastic container made from it can be damaged, for example burst, for example during or blow molding.

The inspection device can be designed such that it initiates an automatic stop and/or the emission of a warning signal and/or an ejection of the preform when it detects a preform unsuited for the blow molding machine.

The warning signal can be an optical and/or acoustic warning signal.

The disclosure provides a method of manufacturing plastic containers by means of a blow molding machine, comprising an automatic detection of different preforms.

The disclosure in particular provides a method of manufacturing plastic containers by means of a blow molding machine, comprising the detection of a preform which is introduced into the blow molding machine, determining whether the preform is suited for being processed in the blow molding machine, and if it is determined that the preform is not suited for being processed in the blow molding machine, stopping the production of plastic containers; and/or emitting a warning message, in particular to an operator, and/or ejecting the preform, and, if it is determined that the preform is suited for being processed in the blow molding machine, generating a signal to a control means of the blow molding machine indicating that the processing of the preform in the blow molding machine can take place, and/or determining at least one treatment parameter in the blow molding machine with which the preform is treated.

If it is determined that the preform is not suited for being processed in the blow molding machine, an in particular automatic readjustment of a treatment parameter can be moreover carried out in the control for one or several treatment stations.

The automatic detection of the preforms can be carried out, for example optically, in particular by a camera. The automatic detection of the preforms can be integrated. for example, in an apparatus provided for measuring the infrared absorption degree.

In the above-described methods and/or blow molding machines, each heating element of the heating device can be allocated to at least one blow molding station. In other words, a preform which was thermally conditioned by a heating element can be fed to one of the at least one blow molding station allocated to the heating element. In particular. several heating stations can be allocated to the same blow molding station.

The allocation of the heating elements to the blow molding stations can be variable in time. If the allocation is changed, one or several treatment parameters of the blow molding station and/or the heating element can be changed.

Above-described blow molding machines can also be operated such that only one type of plastic containers is output. In this case, the performance of the blow molding machine can be reduced. For example, only a predetermined fraction, for example half or third, of all treatment stations may be used in this case. As an alternative, the treatment stations may also be used alternately, that means in an alternating manner, in this case.

BRIEF DESCRIPTION OF THE DRAWINGS

Further features and advantages will be described below with reference to the exemplary figures. In the drawings.

DETAILED DESCRIPTION OF THE PREFERRED EMBODIMENT

Figure 1:
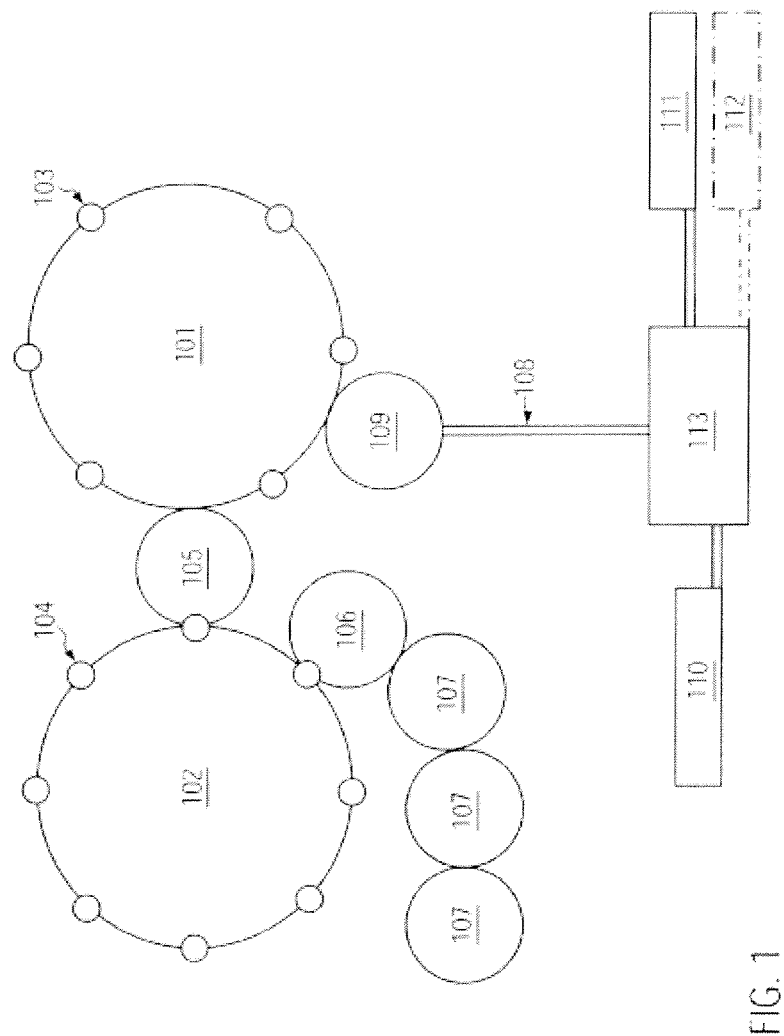
FIG. 1 shows an illustration of an exemplary blow molding machine.

FIG. 1 shows an exemplary blow molding machine with a heating device in the form of a heating wheel 101 and a blow molding wheel 102. The heating wheel 101 comprises several heating elements in the form of heating chambers 103 for heating the preforms. The blow molding wheel 102 comprises blow molding stations 104 in which the heated preforms are blown, in particular stretch-blown, to plastic containers. The heated preforms are transferred from the heating wheel 101 to the blow molding wheel 102 via a transfer element 105. The produced plastic containers can be transferred, for example. to a filling device and/or a labeling device via a discharge element 106 and several transfer elements 107.

The preforms are transferred to the heating wheel 101 via a supply rail 108 and a feeding element 109, for example a zigzag star. The preforms can be in particular different preforms which are withdrawn, for example, from different chutes, for example chutes 110, 111 and 112. Chute 112 is shown in a dashed line which shall indicate that this chute is optional. The blow molding machine, however, can also comprise more than three chutes.

The preforms can be brought into a predetermined sequence by means of a sorting element 113 and then be introduced into the heating wheel 101 via the supply rail 108 and the feeding element 109 in this predetermined sequence ("just-in-sequence").

The blow molding stations 104 of the blow molding wheel 102 can be operated differently, in particular embodied and/or controlled differently. For example, operating parameters of at least two blow molding stations 104 of the blow molding wheel 102 can be different. The operating parameters can be, for example, a point in time and/or size of a preblow pressure, a final blow pressure, a preblow start (and/or end), a rinsing start, a temperature of the preform, a temperature of the wall of a blow mold, a temperature of a mold bottom, a point in time of a rinsing pressure, a pressure progress during preblowing, final blowing and rinsing, a temperature of the blow mold and/or a pressure pad pressure.

The pressure pad pressure can in particular be minimized. In other words, the required mold clamping force can be adapted to the containers to be manufactured. For smaller plastic bottles, for example, a lower pressure can be required, where in particular saving of energy can be possible.

Each blow molding station 104 can be equipped with a separately controllable valve block.

At least two heating chambers 103 of the heating wheel 101 can be operated differently, in particular embodied and/or controlled differently. For example, at least two heating chambers 103 can comprise different temperatures. The heating wheel 101 can be, for example, a rotary oven with heating jackets or heating chambers 103 disposed at it.

For example, the heating wheel 101 can be a STIR oven. STIR (Selectively Transformed Infrared) means that the heating of the preforms is carried out by selective, transformed infrared radiation. Here, the preforms are introduced into heating jackets which essentially completely surround the preforms except for the mouth section. In the process, a heating pin is introduced into the preform which at least partially consists of functional ceramics which converts the infrared radiation introduced from outside and transmitted through the preform to radiation of another wavelength and reemits it to the preform. However, heating jackets which do without this principle can be employed.

By the sorting element 113, the preforms can be brought into a predetermined sequence, in particular such that predetermined preforms 103 are allocated to predetermined heating chambers 103 and/or blow molding stations 104.

For example, the exemplary blow molding machine of FIG. 1 can be used to manufacture four different plastic container types. For this, in particular four different preform types can be used. For example, for the manufacture of clear plastic containers, clear preforms can be used, for the manufacture of green plastic containers, green preforms, for the manufacture of blue plastic bottles blue preforms, and for the manufacture of reddish plastic bottles reddish preforms can be used.

Preforms of these four different preform types can be introduced into the blow molding machine such that each of the preforms is allocated to one heating chamber 103 and/or one blow mold 104 which are operated adapted to the preform. For example, heating chambers 103 and/or blow molding stations 104 for clear preforms can be embodied and/or controlled in a different way than heating chambers 103 and/or blow molding stations 104 for green, blue and/or reddish preforms. For example, every fourth treatment station (blow molding station 104 and/or heating chamber 103) along the blow molding wheel 102 and/or the heating wheel 101 can process the same plastic bottle type.

The preforms can differ not only in their color, the preforms can also comprise different grammages, different geometric sizes, different wall thicknesses and/or different threads for different closure types. The blow molding stations 104 can in particular comprise different blow molds for different volumes, for example 0.33 liter, 0.5 liter, 0.75 liter or 1.0 liter. The blow molds can also have different geometries.

The blow molding machine can comprise differently arranged earn plates which control functions of treatment units, for example heating chambers 103 and/or blow molding stations 104. The cam plates can be differently arranged in the radial direction and/or in the vertical direction.

Figure 2:
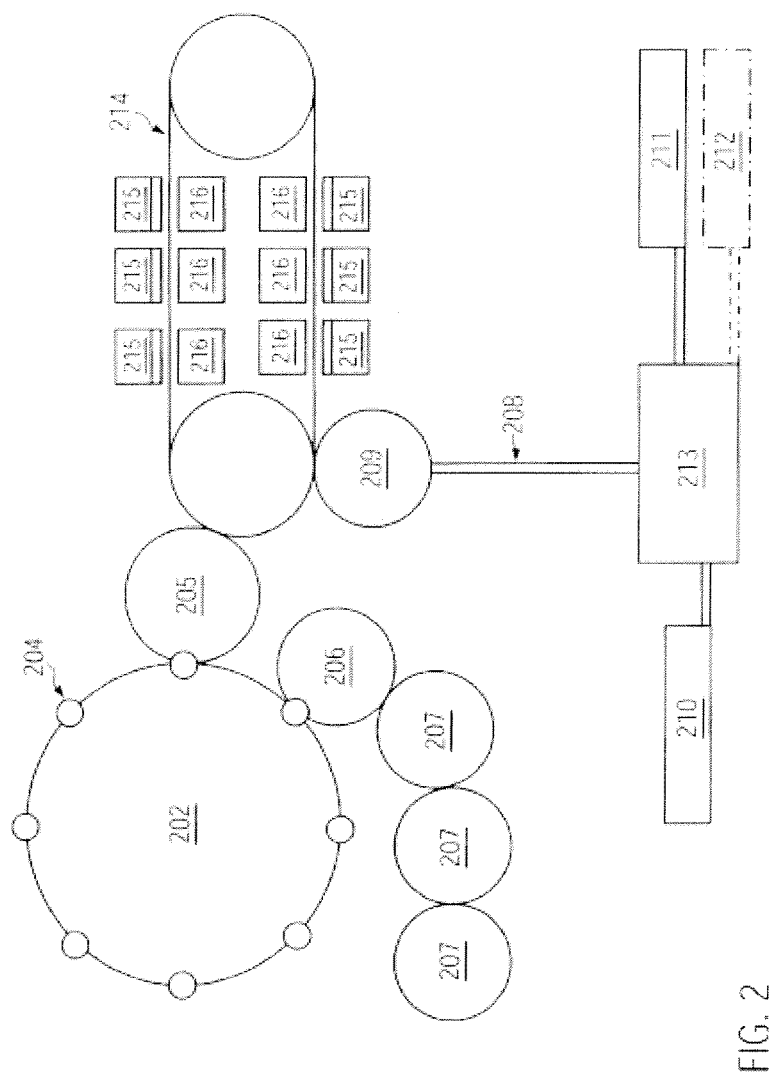
FIG. 2 shows an illustration of an exemplary blow molding machine with a linear oven.

For example, a travel of a bottom mold from one blow molding station 104 to the next one, an opening movement of a heating chamber 103 and/or blow molding station 104, and/or an immersion depth of a preform into a heating chamber 103 can be varied. With preforms/containers having small diameters, the mold carrier of a heating chamber 103 and/or blow molding station 104 does not have to open very wide, whereby time can be saved and wear/forces reduced. If a linear oven is used as an alternative or in addition to a heating wheel, a height of a transport device through the linear oven can vary. FIG. 2 shows another exemplary blow molding machine. The blow molding machine also comprises a blow molding wheel 202 with several blow molding stations 204 as well as a discharge element 206 and several transfer elements 207. Preforms are introduced into a linear oven from chutes 210, 211 and/or 212 by means of a sorting element 213 via a supply rail 208 and a feeding element 209. The linear oven comprises a transport element 214 for transporting the preforms through the linear oven as well as several heating boxes 215 with vertically arranged, long stretched-out infrared radiators and several reflectors 216.

The heating boxes can be designed and/or controlled such that different preforms are heated to different extents.

Instead of infrared heating elements, microwave heating elements could also be provided. These permit in an effective manner to heat preforms selectively, in particular independently.

The exemplary blow molding machine can be a stretch blow molding machine with servo stretching function. As an alternative, several different cam plates could be provided at the circumference of the blow molding wheel 102, where the immersion position and/or speed of stretch rods are controlled by means of their cam follower (guide rollers). In this way, several stretching speeds can be realized in a carousel of the blow molding machine.

The cam plates can here be arranged radially offset with respect to each other, so that, for example, the stretch rod of every second blow molding station runs at an internal cam plate, and the other stretch rods run at an external cam plate.

This principle can also be applied to a control of one or several shielding devices, for example shielding plates in the linear oven. A shielding plate can be operated by means of a servo, piezo or linear motor. A shielding plate serves as barrier for heat radiation and can be moved with a preform through the linear oven.

To control a predetermined temperature distribution in the mouth region of a preform, a point in time for lifting and/or lowering the shielding plate can be controlled for the mouth region. In particular, the control for different preforms can differ.

The time during which a region of a preform is protected by the shielding plate can be controlled. For example, the shielding plate can be removed before it reaches the end of the linear oven, so that a previously shielded region of the preform, for example a region directly underneath the supporting ring, is also heated for a predetermined time.

For controlling the time in which a region, for example the mouth region, of the preform is protected by the shielding plate, the holding arbor of the preform can also lift and/or lower.

Figure 3:
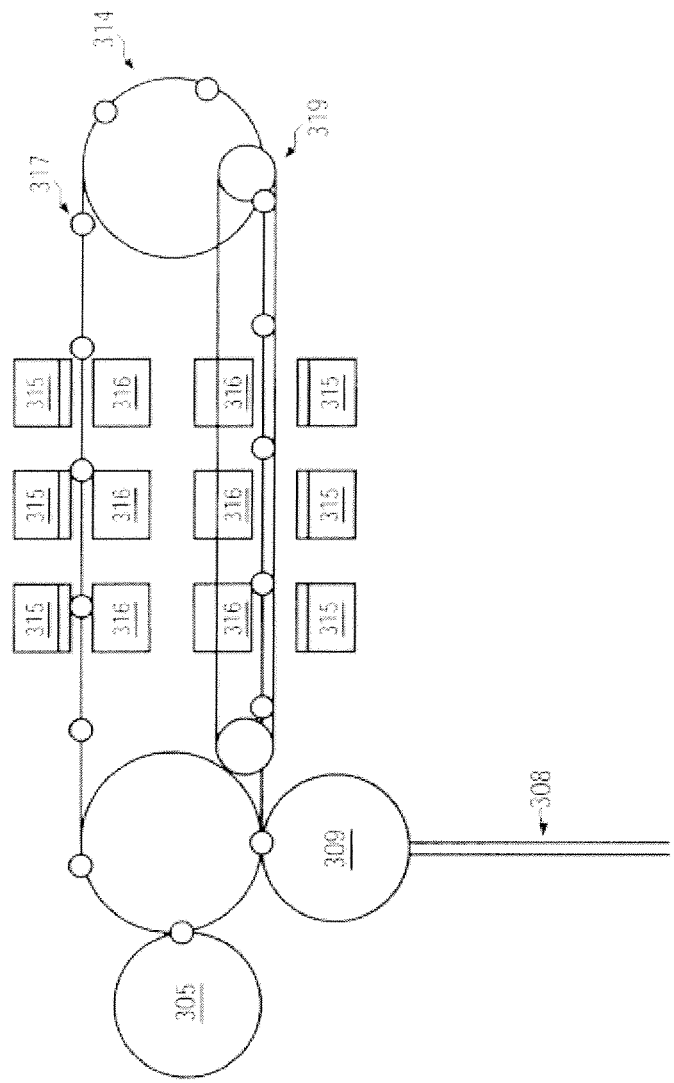
FIG. 3 shows an illustration of a heating device of an exemplary blow molding machine.

FIG. 3 shows details of an exemplary linear oven for a blow molding machine. Preforms can be introduced into the linear oven via a supply rail 308 and a feeding element 309. The preforms can be moved through the linear oven by means of a transport device 314. In FIG. 3, several exemplary heating pins 317 with preforms are shown. FIG. 3 moreover shows a chain drive 319 for rotating the heating pins. Moreover, several heating boxes 315 and reflectors 316 are shown.

Figure 4:
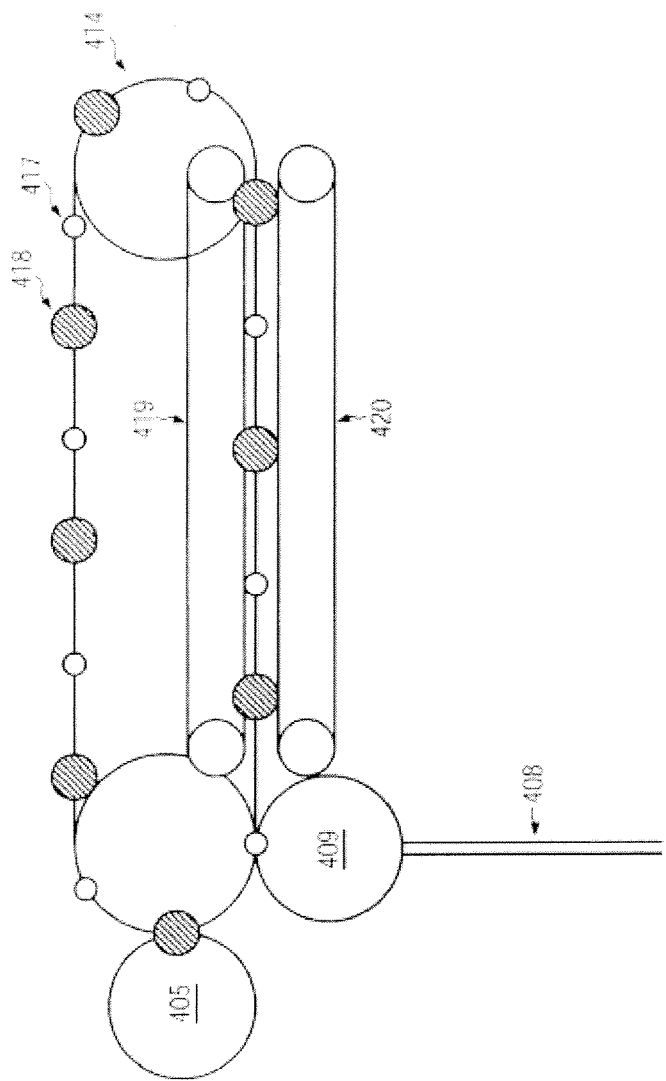
FIG. 4 shows an illustration of a transport device through an exemplary heating device.

FIG. 4 shows an alternative linear oven for a blow molding machine. The preforms are introduced into the linear oven via a supply rail 408 and a feeding element 409. In FIG. 4, the heating boxes are not shown for a better overview. The preforms can be moved through the linear oven by means of a transport element 414. One or several heating pins 417 can be rotated by means of a first chain drive 419, while one or several heating pins 418 can be rotated by means of a second chain drive 420. The two different chain drives 419 and 420 can rotate the heating pins 417, 418 in particular at different speeds. Thereby, different heating of a preform can be achieved depending on the heating pin.

The chain drives 419 and 420 can be arranged at different heights. The chain drives 419 and 420 can also be arranged at different horizontal distances to the heating elements. Gearwheels of the heating pins 417, 418 of different sizes can moreover cause different rotational speeds. Thereby, a preform can be provided with a predetermined temperature profile in the circumferential direction. Different preforms can be thus in particular provided with different temperature profiles. The speeds of the respective chain drives 419 and 420 can be varied for profiling during a heating process of a preform.

Figure 5:
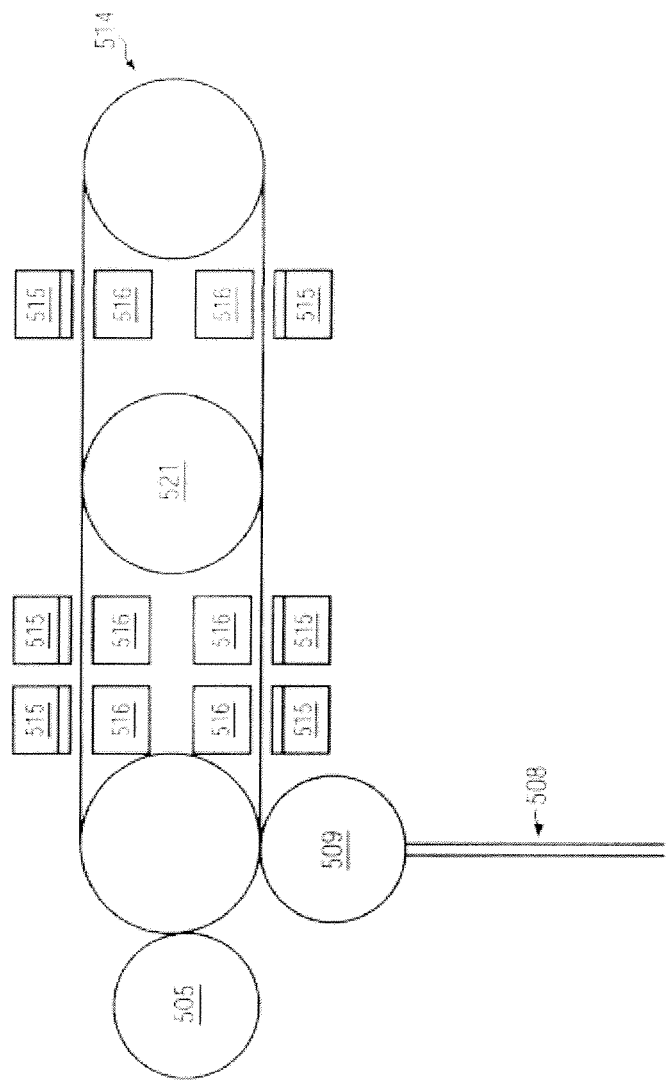
FIG. 5 shows an illustration of a transport device of a heating device of an exemplary blow molding machine.

FIG. 5 shows another exemplary linear oven for a blow molding machine. The transport element 514 which moves the preforms through the linear oven comprises a deflection element 521 which permits to selectively move preforms over a shorter transport path through the linear oven. In particular, FIG. 5 shows a first group of heating boxes 515 and reflectors 516, and a second group of heating boxes 515 and reflectors 516, where the deflection element 521 is arranged between the two groups. A preform introduced into the linear oven via the supply rail 508 and the feeding element 509 can now be optionally moved through the first and the second group of heating boxes 515, or only through the first group of heating boxes 515 by means of the deflection element 521. The heated preforms can be transferred to a blow molding wheel by means of a transfer element 505.

Figure 6:
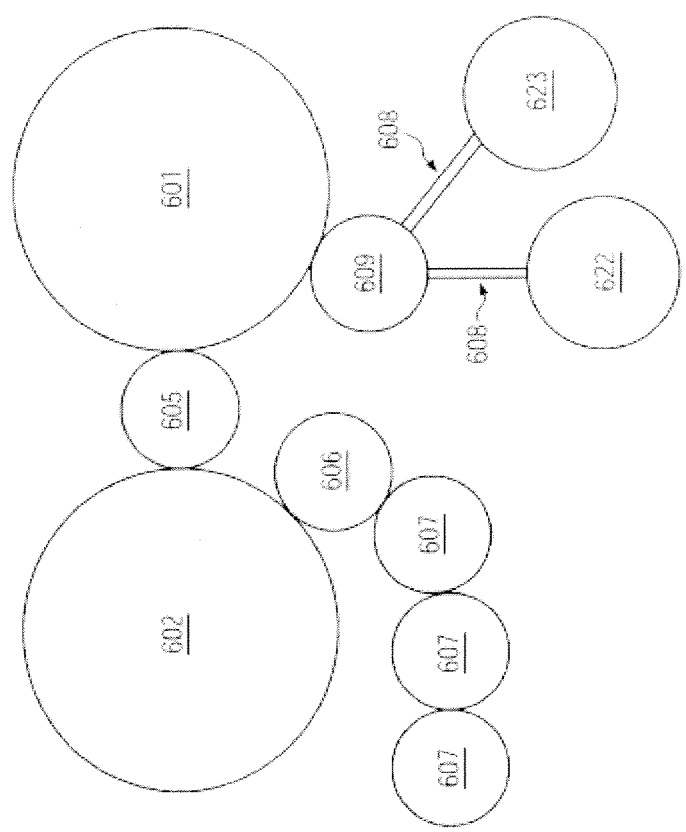
FIG. 6 shows an illustration of an exemplary injection blow molding machine.

FIG. 6 shows an exemplary blow molding machine which is embodied as injection blow molding machine with two injection modules 622 and 623. The injection module 622, for example, can injection mold a first kind or type of preforms, and injection module 623 a second kind of preforms different from the first kind of preforms. The first and the second kind of preforms can differ, for example, in their geometry, color, wall thickness, composition and/or in the thread for a closure. The injection molded preforms can be transferred to a heating wheel 601 via supply rails 608 and a feeding element 609. By means of a transfer element 605, the heated preforms can be transferred to a blow molding wheel 602 from which they can be transported, for example, to a filling device and/or a labeling device via a discharge element 606 and transfer elements 607.

Figure 7:
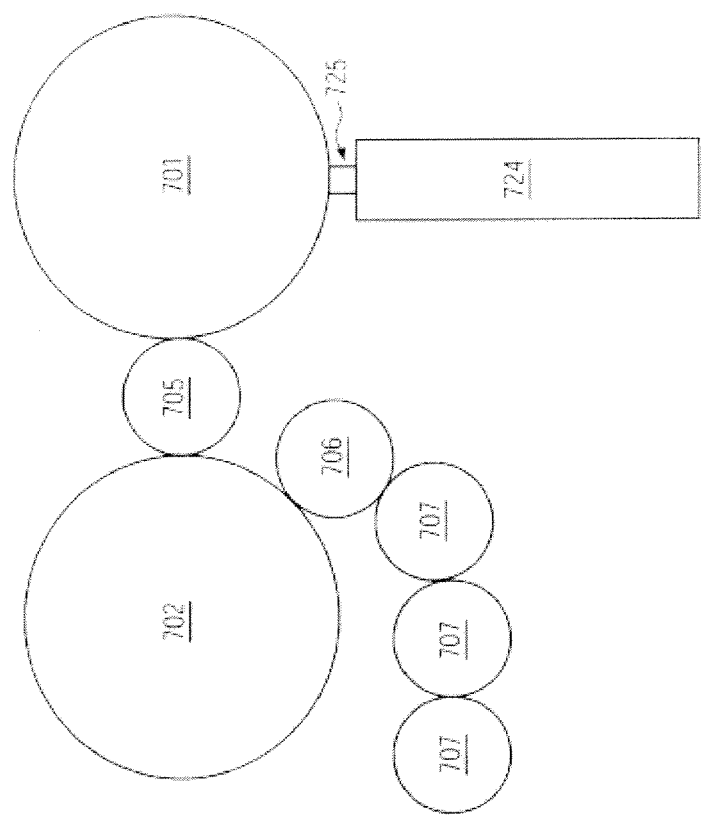
FIG. 7 shows an illustration of another exemplary injection blow molding machine.

FIG. 7 shows an example of a blow molding machine in which the preforms are compression molded by means of a molding press 724 and transferred to a heating wheel 701 via a transfer element 725. The molding press 724 can be operated such that different preforms are manufactured. The preforms can be transferred from the heating wheel 701 to a blow molding wheel 702 via a transfer element 705 and then be moved further over a discharge element 706 and transfer elements 707.

During compression molding, the quantity of plastics discharged from an extruder can be controlled to manufacture different preforms.

Figure 8:
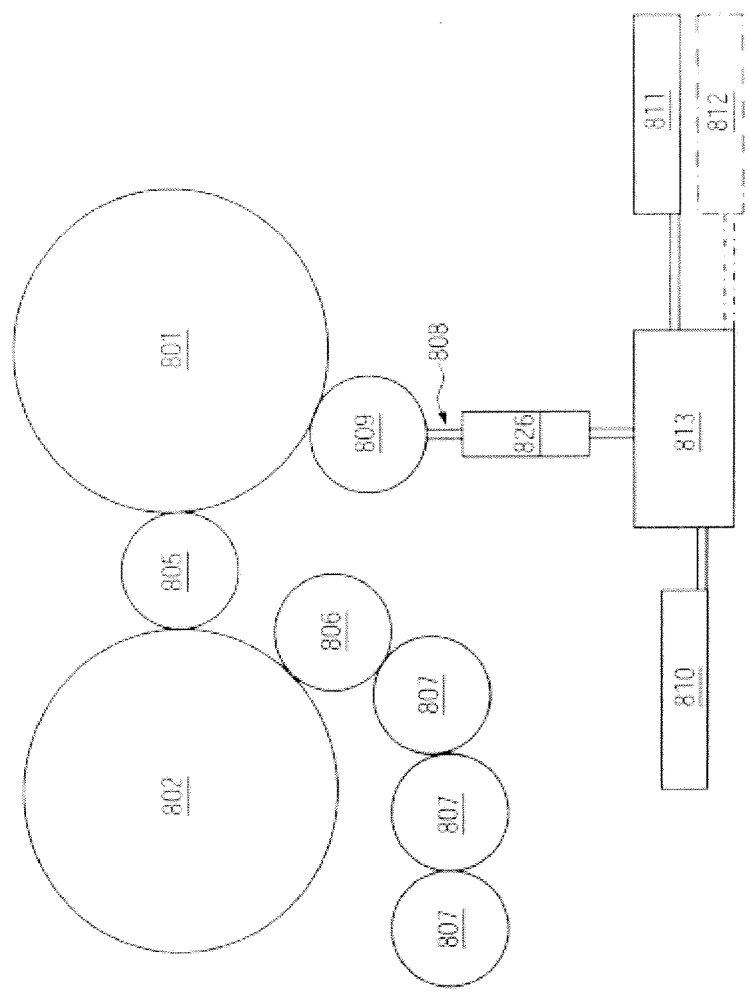
FIG. 8 shows an illustration of an exemplary blow molding machine, comprising a sterilization device.

FIG. 8 shows an exemplary blow molding machine where a sterilization element 826 is provided in the supply rail 808. With the sterilization element 826, the preforms introduced into the blow molding machine can be sterilized. The sterilization device 826 can treat the preforms with cleaning liquid, ionized air. and/or sterile air. Here, lances immersing to different depths (to just before the bottom of the preforms) can be provided and treat the preforms. The quantity of sterilization medium can also vary in different preforms. As an alternative, the preforms can be immersed into dipping baths to different depths for coating and/or sterilization. The sterilization device 826 can also carry out plasma sterilization or coating, in particular where the preforms are coated differently.

Moreover, the blow molding machine shows the already above-mentioned chutes 810, 811 and 812, a sorting element 813, a feeding element 809, a heating wheel 801, a transfer element 805, a blow molding wheel 802, a discharge element 805, and transfer elements 807.

Figure 9:
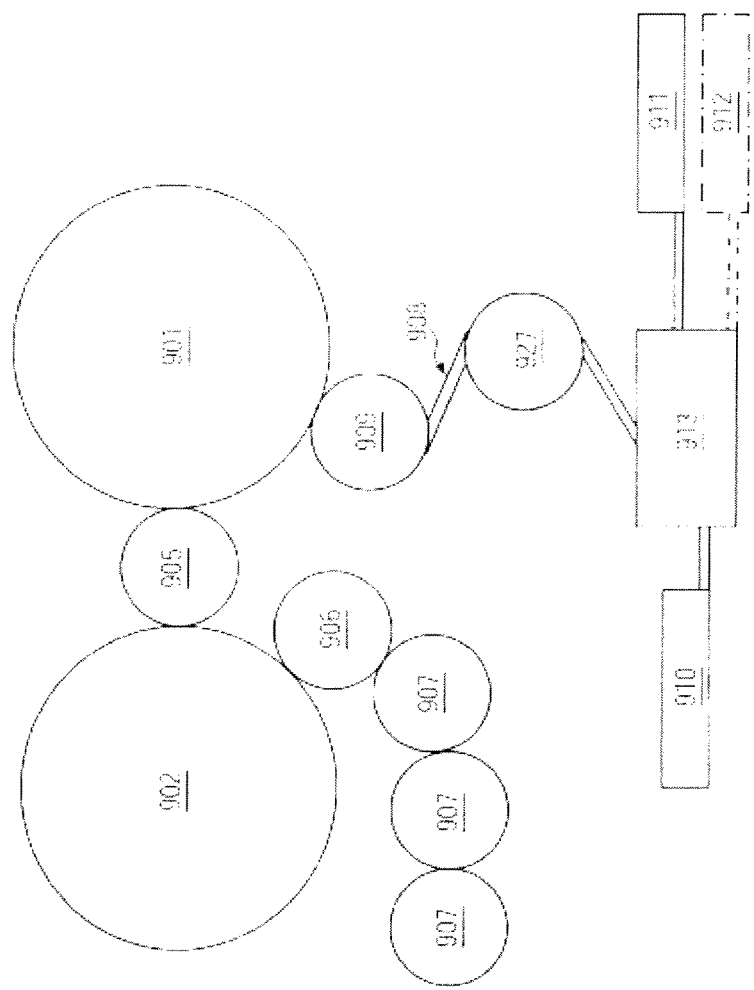
FIG. 9 shows an illustration of another exemplary blow molding machine, comprising a sterilization device.

FIG. 9 shows an exemplary blow molding machine with a rotary sterilization 927 in the path of the supply rail 908. Moreover, the blow molding machine shows the already above-mentioned chutes 910, 911 and 912, a sorting element 913, a feeding element 909, a heating wheel 901, a transfer element 905, a blow molding wheel 902, a discharge element 906, and transfer elements 907.

Figure 10:
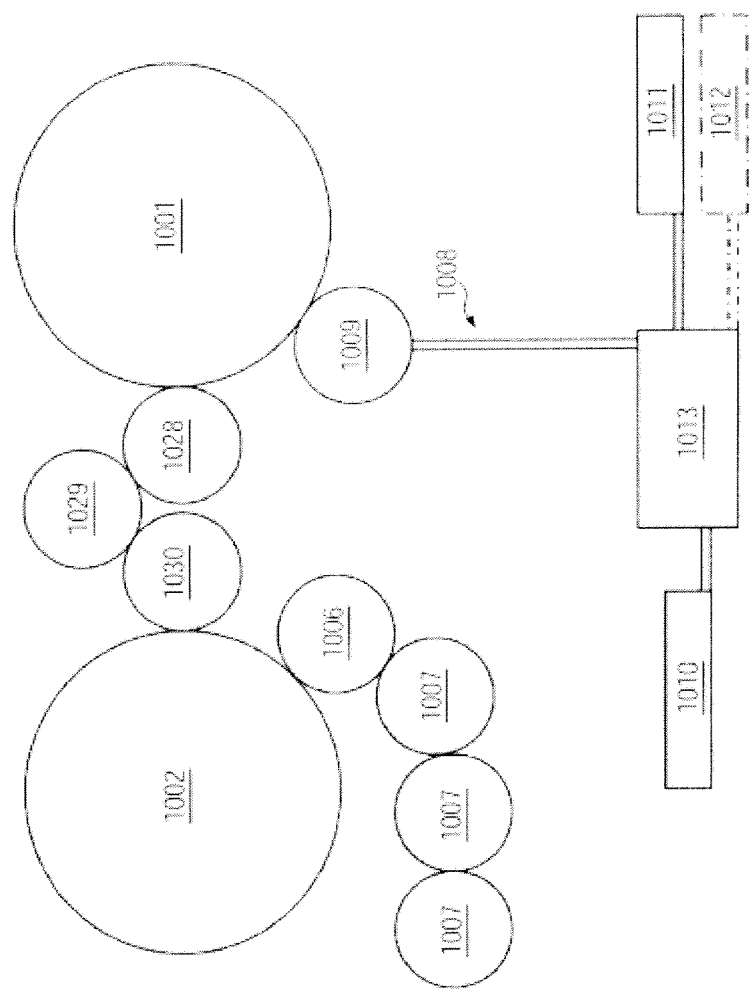
FIG. 10 shows an illustration of another exemplary blow molding machine, comprising a sterilization device.

FIG. 10 shows an exemplary blow molding machine, where a rotary sterilization device 1029 is arranged between the heating wheel 1001 and the blow molding wheel 1002. The preforms are transferred to the sterilization device 1029 via a discharge element 1028 and guided into the blow molding wheel 1002 via a feeding element 1030. FIG. 10 moreover shows the already above-mentioned chutes 1010, 1011, 1012, the sorting element 1013, the supply rail 1008, the feeding element 1009, the discharge element 1006 and transfer elements 1007.

Figure 11:
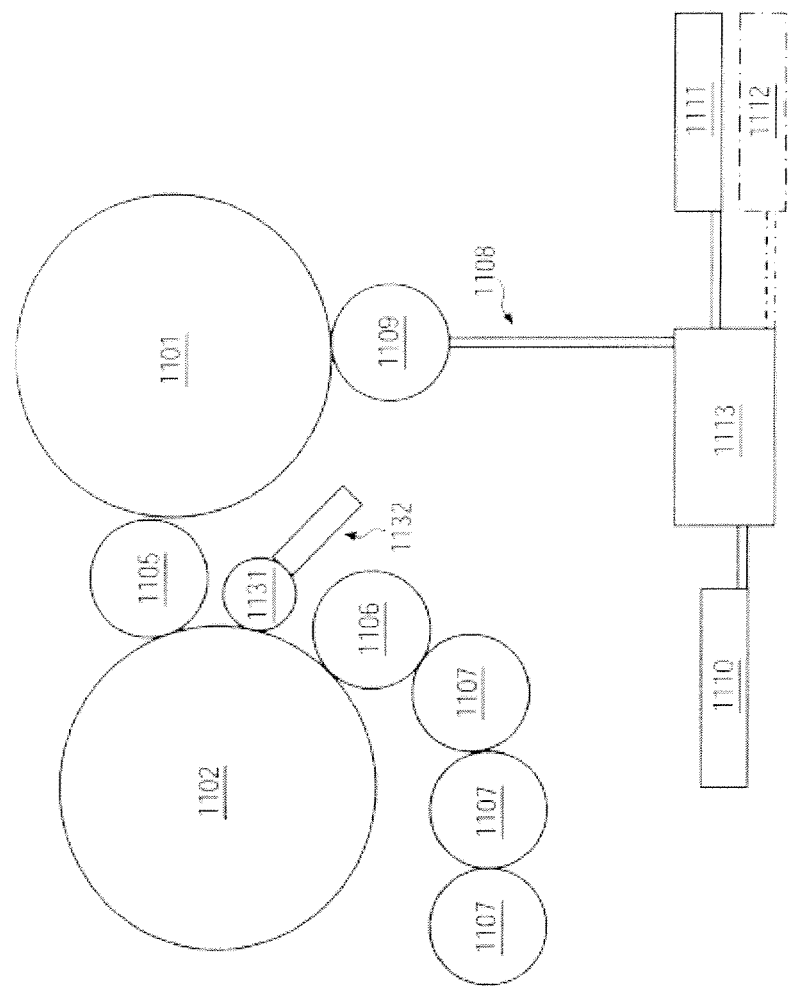
FIG. 11 shows an illustration of an exemplary blow molding machine, comprising a labeling device.

FIG. 11 shows an exemplary blow molding machine, where the blow molding machine comprises a labeling device (in-mold labeling module). The labeling device comprises a labeling aggregate 1131 and a label supply 1132. With the labeling device, the plastic containers manufactured in the blow molding wheel 1102 can be labeled in the blow molding machine. In particular, different labels can be successively introduced into blow molds against which the expanding containers come to lie during blow molding.

FIG. 11 moreover shows the chutes 1110, 1111 and 1112, a sorting element 1113, a supply rail 1108, a feeding element 1109, a heating wheel 1101, a transfer element 1105, a blow molding wheel 1102, a discharge element 1106 and transfer elements 1107.

Figure 12:
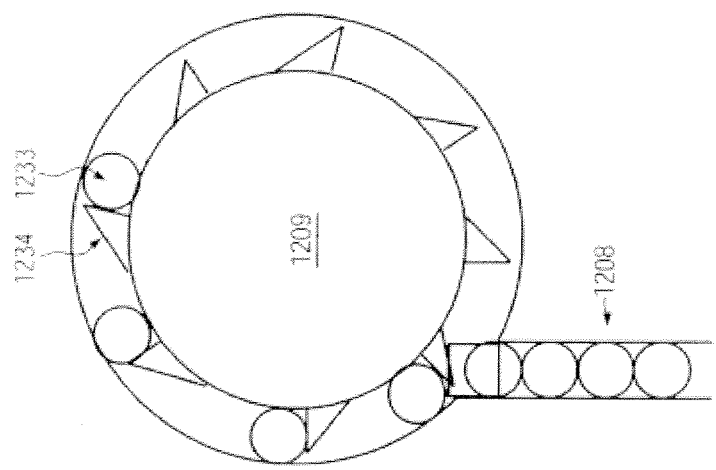
FIG. 12 shows an exemplary transport element of a blow molding machine.

FIG. 12 shows an exemplary feeding element 1209 by means of which for example preforms can be introduced into a heating wheel or a linear oven not shown in FIG. 12 from a supply rail 1208. In particular, the feeding element 1209 in FIG. 12 is embodied as a zigzag star which comprises several tooth elements 1234 for transporting preforms 1233. The feeding element 1209 shown in FIG. 12 is suited for transporting preforms 1233 having the same mouth or neck diameters.

Figure 13:
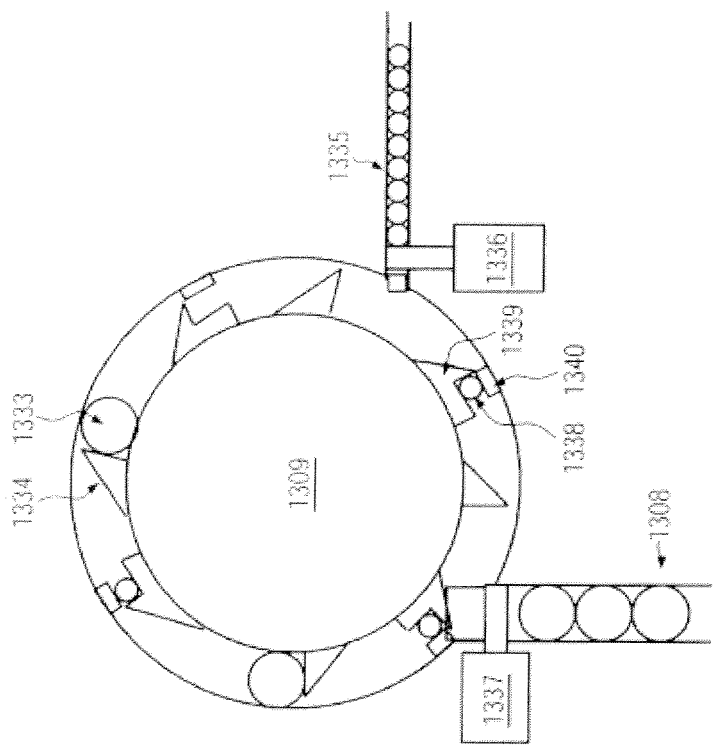
FIG. 13 shows another exemplary transport element of a blow molding machine.

FIG. 13 shows an exemplary feeding element 1309 for a blow molding machine which is embodied as a zigzag star and permits the transport of preforms 1338 and 1333 with different neck diameters. In particular, teeth 1334 which can transport preforms 1333 with a first neck diameter and teeth 1339 which can transport preforms 1338 with a second neck diameter are provided. The second preforms 1338 can be supplied via a second supply rail 1335, while the preforms 1333 with a first neck diameter are supplied via a first supply rail 1308. Stoppers 1337 and 1336 can be provided each for the supply rail 1308 and 1335 to interrupt the supply of preforms. In particular, the stoppers 1337 and 1337 can introduce the preforms into the feeding element 1309 alternately.

As an alternative to a feeding element 1309, the preforms could also be directly withdrawn from a heating pin of a heating wheel or a linear oven from the supply rails. However, this can be aggravated by a non-uniform alignment or positioning of the preforms in the supply rails.

FIG. 13 moreover shows a counter-element 1340 to the saw teeth 1339 which permits more precise positioning of the preforms 1338.

The above-described blow molding machines can be combined, that means joined in a block, with further machines of a bottling plant, in particular a filler and/or a labeling device. For example, block systems in a design of stretch blowing machine—labeling device—filler, or in a design of stretch blowing machine—filler—labeling device are possible.

The above described blow molding machines can moreover comprise an inspection device for automatically detecting preforms, in particular preforms introduced into the blow molding machine. It is thus, for example, also possible to detect preforms which have been unintentionally or erroneously introduced into the blow molding machine.

With the aid of the inspection device, different preforms which are introduced into the blow molding machine arbitrarily, or randomly, for example preforms withdrawn from a chute, can also be processed. For this, the inspection device can be designed and/or configured such that a sensor of the inspection device detects a preform, in particular by detecting at least one physical, chemical and/or geometric property of the preform, and adjusts the heating, sterilization and/or blow molding process to the detected preform. This can comprise an adjustment of a treatment parameter of the heating, sterilization and/or blow molding process.

For example, a travel of a blow nozzle, a stretching speed or an opening angle or distance of the blow molds can be adapted. The above described blow molding machines can moreover comprise an allocation means or distribution means which allocates a detected preform to a predetermined treatment unit.

Moreover, the inspection device can be configured and/or designed to carry out a method, comprising the steps of detecting a preform which is introduced into the blow molding machine, determining whether the preform is suited for being processed in the blow molding machine, and if it is determined that the preform is not suited for being processed in the blow molding machine, stopping the production of plastic containers and/or emitting a warning message.

Several chutes for preforms can be provided, where at least two of the chutes comprise different preforms, that means different types of preforms. After the fittings have been changed, the blow molding machine, in particular a sorting device of the blow molding machine, can be automatically access one or several chutes or storage places, in particular if a certain production order (recipe) is selected and/or if by a detection of a blow mold, a conclusion can be drawn to one or several required preforms.

In an injection blow molding machine, a change of the molds for injection molding and a change of the blow molds can be carried out synchronously, in particular by entering a production order or by selecting at least one blow mold.

The chemical composition of at least one preform can be controlled. Likewise, with a buffer between the blow molding machine and the injection molding machine of an injection blow molding machine, buffer times for cooling can be controlled. This can be done in particular by means of a speed control of the injection molding machine.

In an injection blow molding machine, an optimal ratio ("break-even-point") between a proportion of an infrared absorber and a proportion of heating power can be determined and the injection blow molding machine operated in this manner with such a control.

Even control with respect to the bottle quality and/or the chemical material composition is possible.

The infrared absorber concentration in different heating /ones of a preform can also be varied, in particular based on a comparison of input values. for example measurements of a nine-fold pyrometer or a wall thickness measurement in the heating zones, with the values of an infrared absorption measurement.

It will be understood that features mentioned in the above described embodiments are not restricted to these special combinations and are also possible in any other combinations.

The invention claimed is:

1. Method of manufacturing plastic containers by means of a blow molding machine, comprising operating the blow molding machine such that at least two different plastic containers are output from the blow molding machine within a production cycle;
    manufacturing the at least two different plastic containers from preforms; and
    controlling a heating device of the blow molding machine such that the preforms are heated to different temperatures.

2. Method of manufacturing plastic containers by means of a blow molding machine, comprising operating the blow molding machine such that at least two different plastic containers are output from the blow molding machine within a production cycle; manufacturing the at least two different plastic containers from preforms; and allocating the preforms to different treatment units.

3. Method according to claim 2, wherein the blow molding machine comprises at least two blow molding stations, and controlling the blow molding machine such that the preforms are allocated to different blow molding stations.

4. Method according to claim 1, and introducing the preforms into the blow molding machine in a predetermined sequence.

5. Method according to claim 1, and moving the preforms through the blow molding machine on at least partially different transport sections.

6. Method according to claim 1, and moving the preforms through the blow molding machine at different speeds.

7. Method of manufacturing plastic containers by means of a blow molding machine, comprising operating the blow molding machine such that at least two different plastic containers are output from the blow molding machine within a production cycle; manufacturing the at least two different plastic containers from preforms; and automatically detecting different preforms.

8. Method according to claim 7, and introducing the different preforms into the blow molding machine based on a result of the automatic detection.

9. Method according to claim 1, and manufacturing the preforms.

10. Method according to claim 1, and sterilizing the preforms.

11. Blow molding machine for manufacturing plastic containers, comprising a blow molding machine designed such that at least two different plastic containers can be output in one production cycle, the blow molding machine including a heating device including a heating wheel, and a controller for treating different preforms using different treatment parameters, each of the at least two different plastic containers initially exposed to the heating device as a preform, wherein one of the at least two different plastic containers is heatable to a first temperature and another of the at least two different plastic containers is heatable to a second temperature that is different than the first temperature.

12. Blow molding machine according to claim 11, and an inspection device for automatically detecting preforms.

13. The method of claim 1, further comprising:
    detecting a preform which is introduced into the blow molding machine;
    determining whether the preform is suited for being processed in the blow molding machine; and
    if it is determined that the preform is not suited for being processed in the blow molding machine, then, at least one of:
        stopping the production of plastic containers;
        emitting a warning message; and/or
        ejecting the preform; and
    if it is determined that the preform is suited for being processed in the blow molding machine:
        generating a signal to a control means of the blow molding machine indicating that the processing of the preform can take place in the blow molding machine, and/or
        determining at least one treatment parameter in the blow molding machine with which the preform is treated.

14. Method according to claim 1, wherein the performs are manufactured from one of different performs or performs of the same kind.

15. Method according to claim 9, wherein the manufacturing comprises injection molding.

16. Method according to claim 10, wherein the sterilizing differs for different performs.

17. Method according to claim 13, wherein in emitting a warning message, the warning message is directed to an operator.

18. The method of claim 2, further comprising:
detecting a preform which is introduced into the blow molding machine;
determining whether the preform is suited for being processed in the blow molding machine; and
if it is determined that the preform is not suited for being processed in the blow molding machine, then, at least one of:
stopping the production of plastic containers;
emitting a warning message; and/or
ejecting the preform; and
if it is determined that the preform is suited for being processed in the blow molding machine:
generating a signal to a control means of the blow molding machine indicating that the processing of the preform can take place in the blow molding machine, and/or
determining at least one treatment parameter in the blow molding machine with which the preform is treated.

19. The method of claim 5, further comprising:
detecting a preform which is introduced into the blow molding machine;
determining whether the preform is suited for being processed in the blow molding machine; and
if it is determined that the preform is not suited for being processed in the blow molding machine, then, at least one of:
stopping the production of plastic containers;
emitting a warning message; and/or
ejecting the preform; and
if it is determined that the preform is suited for being processed in the blow molding machine:
generating a signal to a control means of the blow molding machine indicating that the processing of the preform can take place in the blow molding machine, and/or
determining at least one treatment parameter in the blow molding machine with which the preform is treated.

20. The method of claim 7, further comprising:
detecting a preform which is introduced into the blow molding machine;
determining whether the preform is suited for being processed in the blow molding machine; and
if it is determined that the preform is not suited for being processed in the blow molding machine, then, at least one of:
stopping the production of plastic containers;
emitting a warning message; and/or
ejecting the preform; and
if it is determined that the preform is suited for being processed in the blow molding machine:
generating a signal to a control means of the blow molding machine indicating that the processing of the preform can take place in the blow molding machine, and/or
determining at least one treatment parameter in the blow molding machine with which the preform is treated.

* * * * *